Sept. 4, 1934.  C. D. SMITH  1,972,820
PNEUMATIC TIRE CONSTRUCTION
Filed Dec. 29, 1931
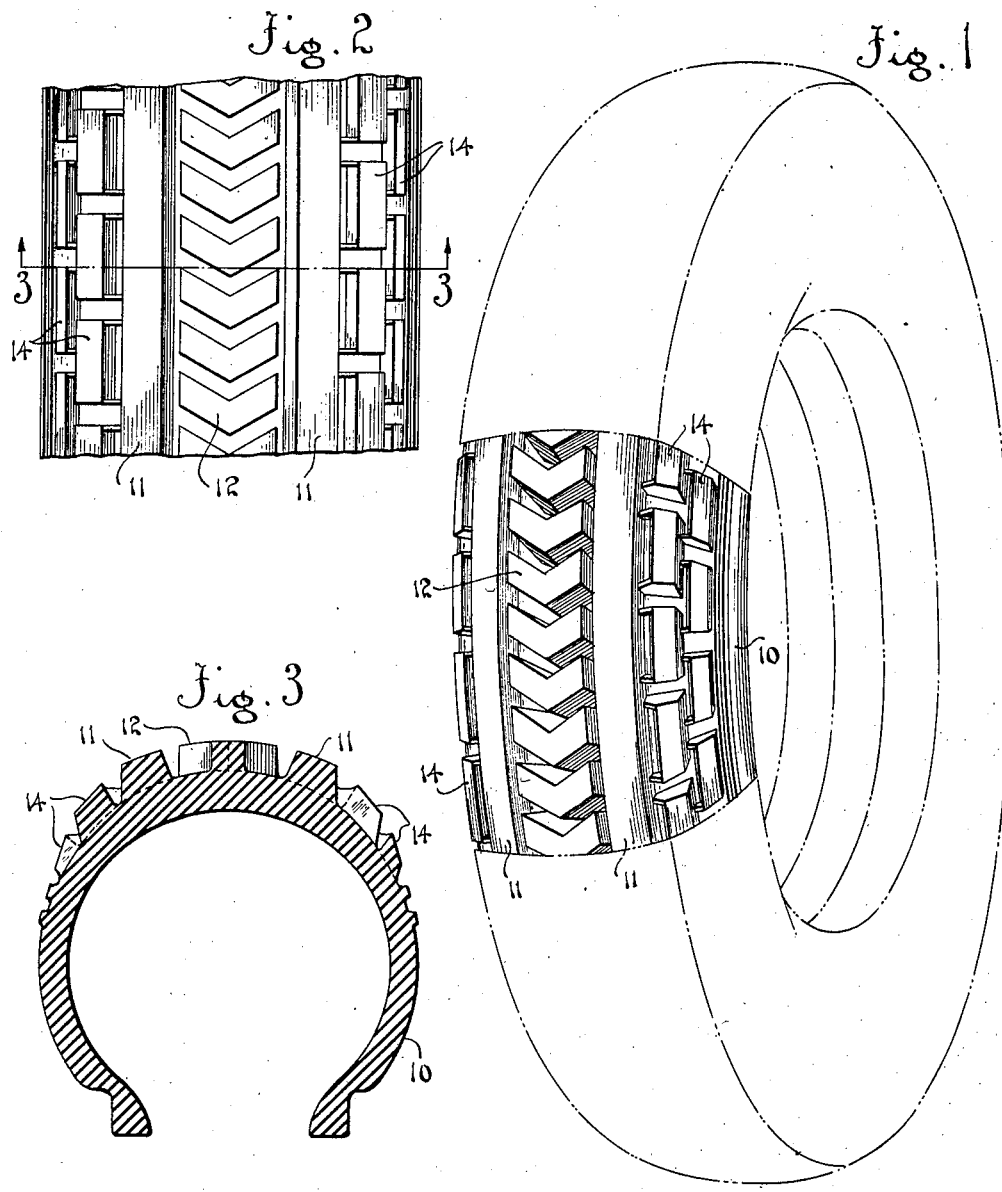
INVENTOR
Clifford D. Smith
BY
ATTORNEYS Patented Sept. 4, 1934

1,972,820

UNITED STATES PATENT OFFICE 1,972,820

PNEUMATIC TIRE CONSTRUCTION

Clifford D. Smith, Fairlawn, Ohio, assignor to The Firestone Tire & Rubber Company, Akron, Ohio, a corporation of Ohio Application December 29, 1931, Serial No. 583,679

3 Claims. (Cl. 152—14)

This invention relates to pneumatic tire constructions, and more especially it relates to the configuration of the tread portion thereof.

The invention has been found highly advantageous in its application to tires for motorcycles, which tires normally are subjected to considerable wear on their shoulders, relatively remote from the central plane of the tires, by reason of the inclination assumed by motorcycles in rounding curves. The regions of shoulder wear on the tires comprise the hinges where tread and side walls meet, so that reinforcing of said shoulders involves the provision of rugged skid-preventing means without the sacrifice of flexibility.

The chief objects of the invention are to provide for uniform wear upon the tread portion of the tire; to improve the riding quality of the tire; to provide for maximum tractive action in the tread elements; and to provide a rugged non-skid configuration on the shoulders of a tire without sacrifice of circumferential or transverse flexibility of the tire.

Of the accompanying drawing:

Figure 1 is a fragmentary perspective view of a pneumatic tire embodying the invention;

Figure 2 is a fragmentary edge elevation thereof; and

Figure 3 is a section on the line 3—3 of Figure 2.

Referring to the drawing, 10 is a pneumatic tire casing, the tread portion of which comprises a pair of circumferential ribs or rider strips 11, 11 that are disposed equi-distant from the central plane of the tire, and which constitute the lateral marginal portions of the tread. Between the ribs 11 the tread configuration consists of a circumferential series of chevrons 12, which are shown herein as all pointing in the same direction. The chevrons 12 are entirely disconnected from each other and from the ribs 11, and best results have been obtained when the interior angle of the chevrons is not less than 120 degrees and not greater than 140 degrees. The width of the bars of the chevrons and the distance between chevrons also have been found to have a relation to their wear resistance, best results having been obtained with bars 21/64 inches wide and spaced 31/128 inches apart.

The spacing of the chevrons with relation to their angle and width is such that the chevrons are slightly nested, that is, a line connecting the two trailing points of one chevron will transect the adjacent chevron near the apex thereof as is most clearly shown in Figure 2. The arrangement is such that the chevrons provide a continuous supporting surface notwithstanding their spaced apart relation, whereby maximum riding comfort is obtained without sacrificing the tractive advantages of the chevron design.

Since the chevrons all face the same way it will be seen that their operation will be slightly different when the tire rotates in one direction than when it rotates in the opposite direction. Tests have shown that this difference of operation results in a difference of only about one per cent in the life of the tire so that it may be considered negligible.

Laterally of each rib 11 the respective shoulders of the tire are formed with two concentric series of rectangular blocks 14, 14, said blocks being disposed end to end in spaced relation to adjacent blocks of the same series and the adjacent series. The blocks 14 of one series are disposed in staggered relation to those of the adjacent series as is most clearly shown in Figure 1, and the blocks have square edges along their margins nearest the ribs 11 so as to provide effective resistance to skidding when the tire is sharply inclined. The arrangement of the blocks 14 provides flexibility and traction, and the tire is not subject to flex breaks as is the case when solid or heavy shoulder designs are employed.

The invention provides a long wearing tire that is especially adapted for use on motorcycles, and achieves the several advantages set out in the foregoing statement of objects.

Modification may be resorted to within the scope of the appended claims which are not limited wholly to the specific construction shown and described.

What is claimed is:

1. A pneumatic tire for motorcycles having its respective shoulder portions formed with two circumferential series of rectangular blocks, the blocks of one series being staggered with relation to the blocks of the other series, a web extending radially outwardly from each end of each of said blocks and joined to the respective shoulder portions of said tire for supporting the end portions of said rectangular blocks during a layover of the motorcycle as the latter is being guided about a curved path.

2. A pneumatic tire for motor cycles including a non-skid tread portion, two spaced circumferential ribs formed adjacent the shoulder portions of the tread, a series of disconnected chevron-shaped tractive elements between the ribs, and a non-skid element disposed outside of each of the ribs, said elements constituting projections formed on the sides of the tread and having radially outwardly extending edges to prevent skidding, said projections being defined by surfaces forming an acute dihedral angle extending inwardly from the radially outer peripheral edge of said projections.

3. A pneumatic tire for motorcycles including a non-skid tread portion, two spaced circumferential ribs formed adjacent the shoulder portions of the tread, and a non-skid element disposed outside of each of the ribs, said elements constituting projections formed on the sides of the tread and having radially outwardly extending edges to prevent skidding, said projections being defined by surfaces forming an acute dihedral angle extending inwardly from the radially outer peripheral edge of said projections, and a web extending radially outwardly from each end of each of said non-skid elements and joined to the respective shoulder portions of said tire for supporting the end portions of said non-skid elements during a layover of the motorcycle as the latter is being guided about a curved path.

CLIFFORD D. SMITH.